US007561290B2

(12) United States Patent
Uejo

(10) Patent No.: US 7,561,290 B2
(45) Date of Patent: Jul. 14, 2009

(54) PRINT MANAGEMENT

(75) Inventor: Hiroyoshi Uejo, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 791 days.

(21) Appl. No.: 10/939,458

(22) Filed: Sep. 14, 2004

(65) Prior Publication Data

US 2005/0213131 A1 Sep. 29, 2005

(30) Foreign Application Priority Data

Mar. 24, 2004 (JP) ............................ 2004-087091

(51) Int. Cl.
*G06F 15/00* (2006.01)
*G06F 3/12* (2006.01)

(52) U.S. Cl. ...................... 358/1.15; 358/1.9; 358/1.13

(58) Field of Classification Search ................ 358/1.12, 358/1.13, 1.14, 1.15, 1.6, 1.9
See application file for complete search history.

(56) References Cited

U.S. PATENT DOCUMENTS 5,768,483 A * 6/1998 Maniwa et al. ............ 358/1.15
6,714,313 B1 * 3/2004 Sugaya ...................... 358/1.15
6,785,012 B2 * 8/2004 Okazawa .................. 358/1.14
2001/0043346 A1 * 11/2001 Roztocil et al. ............. 358/1.9
2002/0131075 A1 * 9/2002 Kremer ..................... 358/1.15
2003/0151768 A1 * 8/2003 Iida .......................... 358/1.15
2004/0001217 A1 * 1/2004 Wu .......................... 358/1.15
2004/0145768 A1 * 7/2004 Stringham ................. 358/1.14
2004/0190042 A1 * 9/2004 Ferlitsch et al. ........... 358/1.15

FOREIGN PATENT DOCUMENTS

JP 2002-113971 A 4/2002

* cited by examiner

*Primary Examiner*—King Y Poon
*Assistant Examiner*—Akwasi M Sarpong
(74) *Attorney, Agent, or Firm*—Oliff & Berridge, PLC

(57) ABSTRACT

When color proofing is instructed in a first printing instruction, an MIS (Management Information System) apparatus of a printing system detects whether or not a DDCP (Digital Direct Color Proofer) can execute the color proofing. If the DDCP can execute the color proofing, the MIS apparatus outputs the first printing instruction to an agent of the DDCP. If the DDCP cannot execute the color proofing, the MIS apparatus converts the first printing instruction into a second printing instruction, and outputs the second printing instruction to a job flow engine of an image forming apparatus.

14 Claims, 8 Drawing Sheets

PRINT MANAGEMENT

CROSS-REFERENCE TO RELATED APPLICATION

This application claims priority under 35 USC 119 from Japanese Patent Application 2004-87091, the disclosure of which is incorporated by reference herein.

BACKGROUND OF THE INVENTION

1. Technical Field

The present invention relates to a print managing apparatus, method, program, and recording medium, and to a printing system. For example, the present invention relates to a print managing apparatus, method, program, and recording medium, and to a printing system which manage the printing processing of printed matter when carrying out printing via a plurality of printing steps using a printing plate, or when carrying out printing via a plurality of printing steps using an image forming apparatus (such as a printer or the like) which has a so-called printing function which forms an image onto a recording medium.

2. Description of the Related Art

In conventional printing (e.g., offset printing), for example, the intermediate products of a print of a photocomposition (photographic printing paper), a block copy, a negative halftone, a positive halftone, and a presensitized printing (PS) plate are prepared, and printing and binding are carried out by using these intermediate products as the bases for the printing and binding.

For example, the printing step includes the facing step, the RIP step, the CTP step, the printing press step, the folding machine step, the cutting machine step, and the binding machine step. The facing step is a step of deciding upon the image positions in accordance with the layout. The RIP step is a step of preparing image data for printing from the layout data. The CTP step is a step of preparing a printing plate from the image data. The printing press step is a step of carrying out printing by using the printing plate. The folding machine step is a step of carrying out folding in accordance with the specifications of the printed media. The cutting machine step is a step of cutting, in accordance with specifications, the media which have undergone folding after printing. The binding machine step is a step of binding, in accordance with specifications, the media which have undergone folding and cutting after printing. These respective printing steps are carried out independent of one another, and are an independent processing for each step.

In recent years, owing to the increased popularity of DTP (Desktop Publishing/Prepress), "direct printing" or "on demand printing, which is printing directly from the DTP data, has come to be known. In DTP, the following processings are coming into wide use: printing data, which is obtained by processing the page layout on a computer, is formed on a photographic printing paper or a plate-making film, and on the basis thereof, a printing plate is prepared and printing is carried out. Further, much attention is also being paid to CTP (Computer-To-Plate) in which a printing plate is formed directly from electronic data without forming an intermediate product. Image forming apparatuses which are equipped with a printing function, such as printers and copy machines, are known as structures which can be used in such printing processing.

In electrophotographic printers which are often used in offices, automation by giving instructions from a client to respective devices has been proposed.

In recent years, a fusion of printing and electrophotography has been seen, such as in digital color structures by printers and on-demand printing. However, the current situation is that automation is instructed to devices under individual standards because the work flows are different.

SUMMARY OF THE INVENTION

In view of the aforementioned, a print managing apparatus, a print managing method, a print managing program, and a print managing system which can fuse together a printing system, which carries out printing through a plurality of printing steps using a printing plate or the like, and an image forming system, which forms an image on a recording medium by an electrophotographic printer or the like are demanded.

A first aspect of the present invention is a print managing apparatus in a printing system processing a print job on the basis of a first printing instruction, in which request items in printing steps for obtaining a printed matter are described in a first description format, or a second printing instruction, in which the request items in the printing steps for obtaining the printed matter are described in a second description format which is different than the first description format. This print managing apparatus has a detecting section detecting whether or not a first processing apparatus, which executes a predetermined processing step among the request items included in the first printing instruction, is in a state of being able to execute the predetermined processing step. The print managing apparatus also has a managing section. The managing section outputs the first printing instruction to the first processing apparatus when the first processing apparatus is in the state of being able to execute the predetermined processing step. The managing section outputs, to a second processing apparatus, the second printing instruction which corresponds to the second processing apparatus when the first processing apparatus is not in the state of being able to execute the predetermined processing step. The second processing apparatus can be substituted for the first processing apparatus.

The printing system processes a print job on the basis of a first printing instruction, in which request items in printing steps for obtaining a printed matter are described in a first description format, or a second printing instruction, in which the request items in the printing steps for obtaining the printed matter are described in a second description format which is different than the first description format. The first description format may be a description format in which it is possible to, for example, describe information relating to the processes of printing steps using a printing plate. The second description format is different than the first description format, and may be a description format in which it is possible to describe information relating to processes for linking processings relating to image formation.

In this way, the printing system can process print jobs in accordance with printing instructions of different specifications. In this type of printing system, the print managing apparatus, which manages the printing processing of the printed matter, has a detecting section which detects whether or not a first processing apparatus, which executes a predetermined processing step among the request items included in the first printing instruction, is in a state of being able to execute the predetermined processing step.

The detecting section transmits, for example, a signal inquiring as to the state to the first processing apparatus, and can detect the state of the first processing apparatus in accordance with the contents of the reply.

When the first processing apparatus is in a state of being able to execute the predetermined processing step, the managing section outputs the first printing instruction to the first processing apparatus. Processing is thereby executed by the first processing apparatus.

When the first processing apparatus is not in the state of being able to execute the predetermined processing step, the managing section outputs, to a second processing apparatus which can be substituted for the first processing apparatus, the second printing instruction which corresponds to the second processing apparatus. In this way, the processing which could not be executed at the first processing apparatus can be processed instead by the second processing apparatus.

A second aspect of the present invention is a print managing method able to be executed in a printing system which processes a print job on the basis of a first printing instruction, in which request items in printing steps for obtaining a printed matter are described in a first description format, or a second printing instruction, in which the request items in the printing steps for obtaining the printed matter are described in a second description format which is different than the first description format, the print managing method managing printing processing of the printed matter, and having the steps of: detecting whether or not a first processing apparatus, which executes a predetermined processing step among the request items included in the first printing instruction, is in a state of being able to execute the predetermined processing step; and when the first processing apparatus is in the state of being able to execute the predetermined processing step, outputting the first printing instruction to the first processing apparatus, and when the first processing apparatus is not in the state of being able to execute the predetermined processing step, outputting, to a second processing apparatus which can be substituted for the first processing apparatus, the second printing instruction which corresponds to the second processing apparatus.

In accordance with such a print managing method, the processing which could not be executed at the first processing apparatus can instead be processed at the second processing apparatus.

The third aspect of the invention is a print managing program. In a printing system which processes a print job on the basis of a first printing instruction, in which request items in printing steps for obtaining a printed matter are described in a first description format, or a second printing instruction, in which the request items in the printing steps for obtaining the printed matter are described in a second description format which is different than the first description format, a print managing program executes, at a computer, processings for managing the printing processing of the printed matter. The print managing program causes the following processings to be executed at the computer: detecting whether or not a first processing apparatus, which executes a predetermined processing step among the request items included in the first printing instruction, is in a state of being able to execute the predetermined processing step; and when the first processing apparatus is in the state of being able to execute the predetermined processing step, outputting the first printing instruction to the first processing apparatus, and when the first processing apparatus is not in the state of being able to execute the predetermined processing step, outputting, to a second processing apparatus which can be substituted for the first processing apparatus, the second printing instruction which corresponds to the second processing apparatus. The computer can thereby be made to function as a print managing apparatus.

The fourth aspect of the invention is a printing system in a printing system processing a print job on the basis of a first printing instruction, in which request items in printing steps for obtaining a printed matter are described in a first description format, or a second printing instruction, in which the request items in the printing steps for obtaining the printed matter are described in a second description format which is different than the first description format. This printing system has a first processing apparatus which interprets the first printing instruction, and executes a predetermined processing step among the request items included in the first printing instruction. The printing system also has a second processing apparatus which interprets the second printing instruction, and classifies the request items included in the second printing instruction into processing steps determined in advance, and executes a predetermined processing step among the classified processing steps. The printing system also has a detecting section detecting whether or not the first processing apparatus is in a state of being able to execute the predetermined processing step. The printing system also has a managing section. The managing section outputs the first printing instruction to the first processing apparatus when the first processing apparatus is in the state of being able to execute the predetermined processing step. The managing section outputs, to a second processing apparatus which can be substituted for the first processing apparatus, the second printing instruction which corresponds to the second processing apparatus when the first processing apparatus is not in the state of being able to execute the predetermined processing step.

In accordance with such a printing system, the processing which could not be executed at the first processing apparatus can instead be processed at the second processing apparatus.

BRIEF DESCRIPTION OF THE DRAWINGS

An embodiment of the present invention will be described hereinafter in detail with reference to the following drawings.

FIG. 4A shows only basic fields, FIG. 4B shows fields including the request specifications of a user, FIG. 4C shows fields including specifications for each printing related step, and FIG. 4D shows fields including detailed specifications for each printing related step.

DETAILED DESCRIPTION OF THE INVENTION

System Structure

Figure 1:
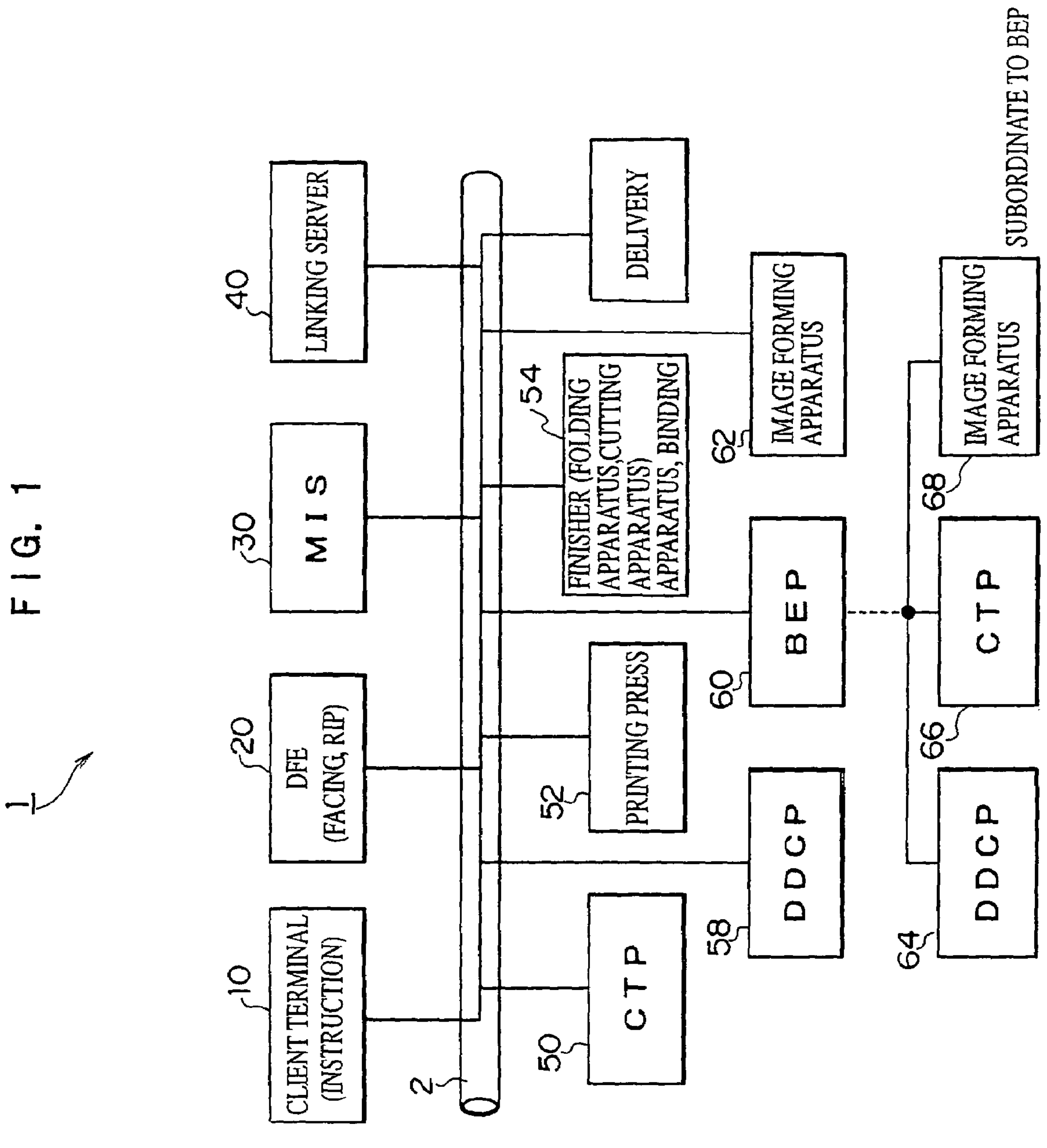
FIG. 1 is a block diagram showing the structure of a printing processing system relating to an embodiment of the present invention.

FIG. 1 is a block diagram showing the structure of a printing processing system 1 relating to an embodiment of the present invention.

In the printing processing system 1, apparatuses for realizing various services relating to printing processing are connected via a network 2. Here, "service" means a function relating to printing which can be utilized in accordance with an external request. Processings such as, for example, preparation of layout data, facing, data conversion, preparation of a printing plate, printing, folding, cutting, binding, and the like correspond to services, but services are not limited to these processings.

In further detail, the printing processing system 1 includes a client terminal 10 which has a user interface and which instructs printing processing for ultimately obtaining, by a plurality of services, a printed matter desired by the user, a DFE (Digital Front End Processor) apparatus 20, an MIS (Management Information System) apparatus 30, a linking server 40, a CTP (Computer To Plate) apparatus 50, a printing press 52, a finisher apparatus 54, and a delivery managing apparatus 56.

The DFE apparatus 20 is an apparatus which transfers printing data to an image forming apparatus such as a CTP or a printer or the like, and instructs printing. The MIS apparatus 30 is an apparatus which controls the apparatuses which are in charge of execution of processings of services in accordance with a printing instruction (first printing instruction) in which information relating to the service procedures instructed by the client terminal 10 is described in a predetermined description format (e.g., JDF: Job Definition Format). The linking server 40 is an apparatus which controls nodes such as programs or apparatuses or the like which are in charge of the execution of processings of services in accordance with a printing instruction (second printing instruction) in which information relating to service linkage instructed at the client terminal 10 is described in another description format. The printing instructions described in these description formats can be expressed in a predetermined language (e.g., XML: Extensible Markup Language). Namely, a printing instruction can be prepared by being expressed in XML in accordance with a predetermined description format or another description format. Note that the language is not limited to XML.

The CTP apparatus 50 is an apparatus which directly forms a printing plate from printing data, without forming an intermediate product. The printing press 52 is an apparatus which prints by using the printing plate formed from the printing data. The finisher apparatus 54 is an apparatus which obtains the printed matter desired by the user (e.g., after binding), by folding, cutting, and binding the sheets after printing. The delivery managing apparatus 56 is an apparatus which manages the processing of delivering the printed matter into the hands of the user.

The MIS apparatus 30 is an apparatus which controls the apparatuses which are in charge of the execution of processings of services in accordance with a printing instruction which is described in a predetermined format (e.g., JDF: Job Definition Format). In the present embodiment, the MIS apparatus 30 has a managing function of managing the entire printing processing system 1. Therefore, the MIS apparatus 30 has the function of being able to prepare printing instructions described by specifications other than (e.g., in a description format other than) the predetermined description format such as JDF or the like.

A DDCP (Digital Direct Color Proofing) apparatus 58, a BEP (Back End Processor) apparatus 60, and an image forming apparatus 62 are connected to the network 2. The image forming apparatus 62 is an apparatus such as, for example, a color copier, a fax machine, a printer, or the like, which has a so-called printing function of forming an image on a recording medium by an electrophotographic system. The image forming apparatus 62 can have an apparatus structure which includes the functions of the aforementioned finisher apparatus 54. The DDCP apparatus 58 may be an output apparatus which carries out printing output for color proofing directly from DTP data, or may be an output apparatus which outputs a large plate which has been subjected to facing processing for plate forming. The BEP apparatus 60 is an apparatus which has the function of carrying out various types of processings on the data obtained after the printing data in accordance with the instruction from the client has been converted (RIP processed) into raster data. The BEP apparatus 60 can be connected to output apparatuses such as a DDCP apparatus 64 which is similar to the aforementioned DDCP apparatus 58, a CTP apparatus 66 which is similar to the aforementioned CTP apparatus 50, an image forming apparatus 68 which is similar to the aforementioned image forming apparatus 62, and the like. Namely, under the management of the BEP apparatus 60, any one of or plural of the DDCP apparatus 64, the CTP apparatus 66, and the image forming apparatus 68 can be connected.

The linking server 40 can have, as the system structure for realizing service linking, a service retrieving server which retrieves the desired service of the user, an instruction preparing server which prepares a printing instruction from information relating to the service linking instructed at the client terminal 10, and a linked processing server carrying out linked processings of respective services in accordance with the printing instruction. Moreover, the linking server 40 may have an image processing apparatus which carries out image processings such as noise removal processing of an image document, image rotating processing, OCR processing, binding of an image, or the like; a document managing server which manages documents; a document distributing server which distributes documents; and a service processing apparatus which carries out a service processing determined in advance.

"Service linking" means having relationships among services, such as the results of an arbitrary service determining the services to be started thereafter or affecting the operations of services from then on, or the like. Here, a "service" is a function relating to printing processing which can be utilized in accordance with a request from the exterior. For example, copying, printing, scanning, fax transmission and receipt, mail distribution, storage to a repository and reading-out from a repository, OCR (Optical Character Recognition) processing, noise removal processing, and the like correspond to services, and the services are not particularly limited. Accordingly, the linking server 40 links plural services and manages the instruction of the printing processing desired by the user. The linking server 40 makes the linked processings of the respective services be executed in accordance with the printing instruction, from information relating to service linking in accordance with the printing instruction.

In the present embodiment, the printing processing system 1 is structured such that the plural apparatuses which carry out the predetermined printing related processings are connected via the network 2. The printing processing system 1 is not particularly limited provided that the plural services are connected via the network 2.

Here, the "printing instruction" is data which, when a series of processings relating to printing is dismantled into plural mechanical steps, includes information expressing the relationships of the respective steps, and parameter information utilized in functions executed in the respective steps. The printing instruction is described in a description format which is determined in advance (e.g., JDF or the like) (refer to FIGS. 4A through 4D).

Figure 2:
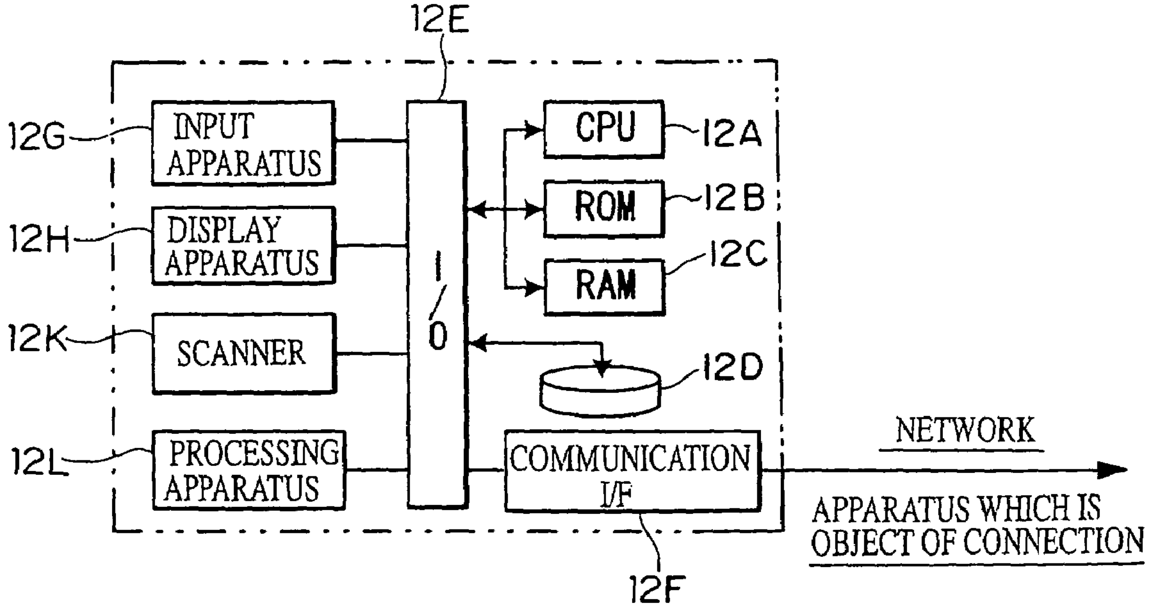
FIG. 2 is a block diagram showing the basic structure of respective apparatuses structuring the printing processing system relating to the embodiment of the present invention.

FIG. 2 comprehensively shows the client terminal 10 as an example of the basic structure of each apparatus structuring the printing processing system 1. At least a CPU 12A is provided, and is connected to an input/output bus ("I/O" in the figure) 12E. A ROM 12B and a RAM 12C are provided as elements associated with the CPU 12A. An input apparatus 12G such as a keyboard or a mouse or the like, a display apparatus 12H such as a display or the like, and a scanner apparatus 12K for image reading can be connected to the input/output bus 12E. Further, a processing apparatus 12L, such as a printer or a proofer or the like which realizes the functions of the processing at that apparatus, and a communication interface 12F, which is for connection with the network 2 or an apparatus which is an object of connection (a local host), can be connected to the input/output bus 12E.

The respective apparatuses structuring the printing processing system 1 operate by the hardware resources having these structures and by software resources which are processing programs stored in the ROM 12B and the RAM 12C. Note that each apparatus structuring the printing processing system 1 has an agent function portion (see FIG. 3) which uses the hardware resources and the software resources and which is for interpreting the printing instruction. The agent function portion interprets the description format (e.g., JDF or the like) of the XML described in the printing instruction, and carries out conversion processing of the description format (e.g., JDF or the like) and the exclusive language used for operating the processing portion or the function portion which is the device of each apparatus structuring the printing processing system 1.

Figure 3:
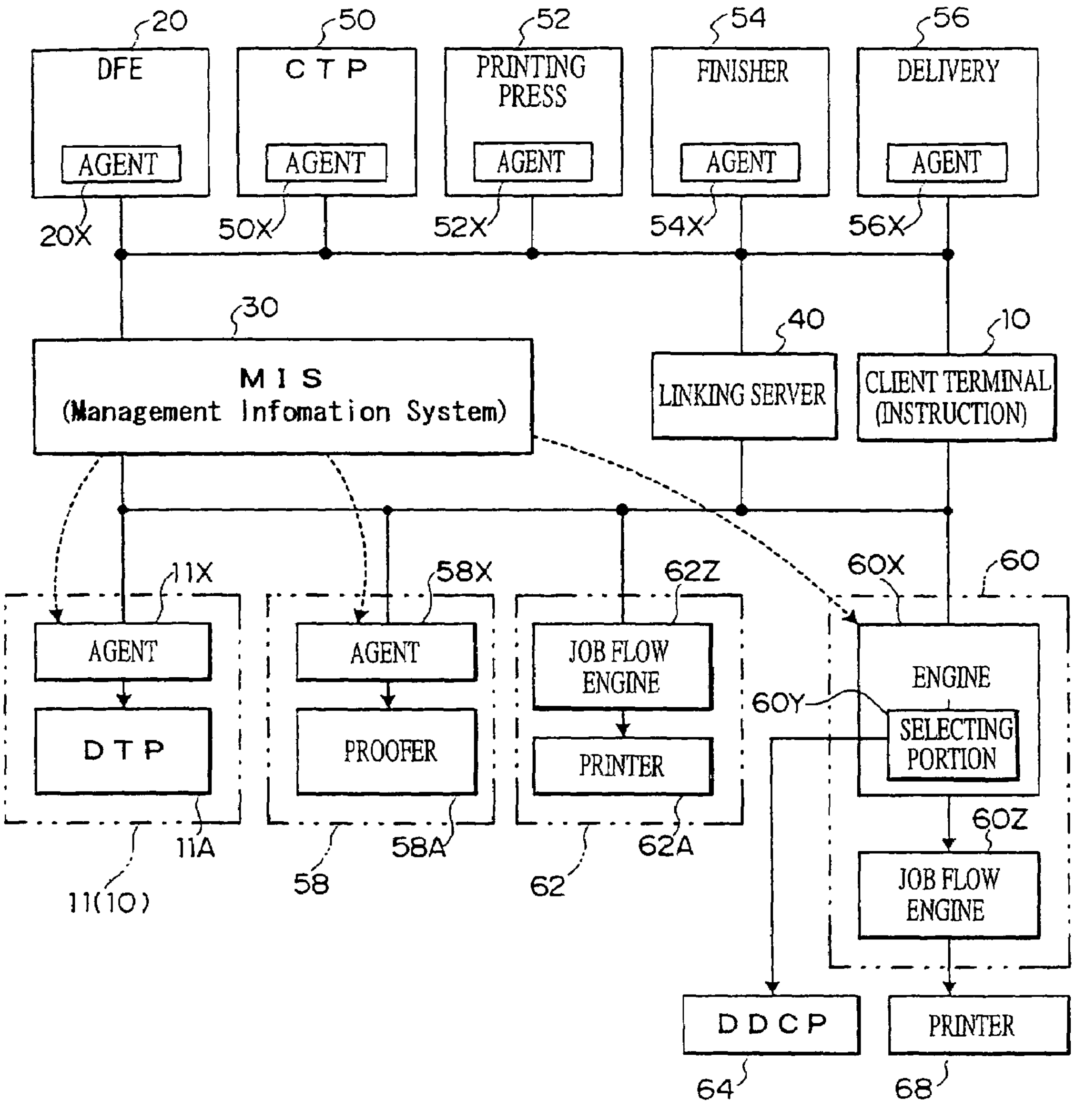
FIG. 3 is a block diagram for explaining the interrelationships among the respective apparatuses structuring the printing processing system.

FIG. 3 is a block diagram for explanation of the interrelationships among the respective apparatuses structuring the printing processing system 1. Each apparatus has an agent function portion which stores interface information expressing the contents of the service which that apparatus provides, and which interprets the description contents described in the printing instruction. Note that, in the following explanation, unless otherwise stated, the agent function portion is structured so as to be able to interpret description contents which are described in a printing instruction which is described in a first description format (e.g., JDF).

Namely, each apparatus in FIG. 3 clearly shows the agent function portion, with the respective apparatuses shown in FIG. 1 being the basic structure. The client terminal 10 can selectively utilize printing instructions described in the first description format (e.g., JDF) and a second description format (e.g., an XML description format in accordance with a description format other than JDF). A DTP apparatus 11 enables processings based on printing instructions described in the first description format (e.g., JDF), and has an input editing function, and forms a photographic printing paper or a plate-making film or the like by using printing data obtained by processing a page layout on a computer. Therefore, the DTP apparatus 11 is structured from an agent function portion 11X and a DTP function portion 11A. Note that the DTP apparatus 11 may be structured so as to only have the functions of receiving printing data in accordance with a page layout prepared by the client terminal 10 and forming the photographic printing paper or the plate-making film or the like.

The respective apparatuses of FIG. 3 are the DFE apparatus 20, the CTP apparatus 50, the printing press 52, the finisher apparatus 54, the distribution managing apparatus 56, and the DDCP apparatus 58 as structures which can carry out processings based on printing instructions described in the first description format (JDF). The MIS apparatus 30 is an apparatus which exercises general control of management of printing instructions described in JDF. The linking server 40 is for exercising general control of management of printing instructions described in the second description format (e.g., an XML description format in accordance with a description format other than JDF).

In FIG. 3, there are differences in the structures of the image forming apparatus 62 and the image forming apparatus 68. Namely, the image forming apparatus 62 is a structure which is directly connected to the network 2, whereas the image forming apparatus 68 is subordinate to the BEP apparatus 60. In the present embodiment, the image forming apparatus 62 is for realizing the processings in accordance with printing instructions described in the second description format (e.g., an XML description format in accordance with a description format other than JDF). Therefore, the image forming apparatus 62 is structured from a job flow engine 62Z for interpreting printing instructions in the second description format, and a printer apparatus 62A. Namely, the job flow engine 62Z is a structure which interprets a printing instruction described in the second description format (e.g., an XML description format in accordance with a description format other than JDF), and converts the data into the language particular to the printer apparatus 62A. The job flow engine 62Z converts data, which is in accordance with an inputted printing instruction described in the second description format (e.g., an XML description format in accordance with a description format other than JDF), into data in the language particular to the printer apparatus 62A, and outputs this data to the printer apparatus 62A.

The BEP apparatus 60 is structured such that apparatuses subordinate thereto can implement both processings in accordance with printing instructions described in the first description format (e.g., JDF), and processings in accordance with printing instructions described in the second description format (e.g., an XML description format in accordance with a description format other than JDF). To this end, the BEP apparatus 60 has an agent function portion 60X for interpreting both description formats. Further, the BEP apparatus 60 can have the function of converting between the both description formats. The agent function portion 60X includes a selecting portion 60Y for selecting, as the connection destination thereof, an apparatus which can execute processings of a printing instruction in accordance with the first description format, and for selecting an output destination directed toward an apparatus which can execute processings of a printing instruction in accordance with the second description format. The DDCP apparatus 64 is connected to the selecting portion 60Y. The image forming apparatus 68 is connected to the selecting portion 60Y via a job flow engine 60Z for interpreting printing instructions in accordance with the second description format.

Figure 4A:
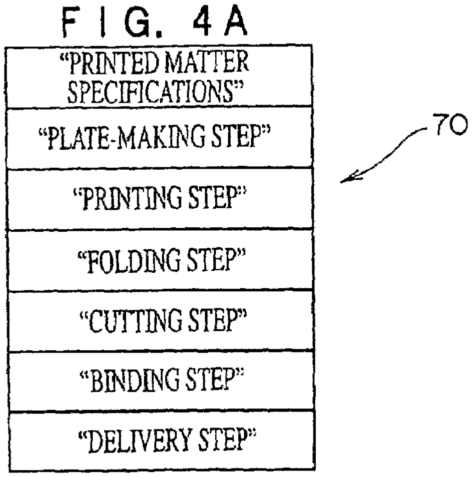
FIGS. 4A through 4D are image diagrams showing the structure of a printing instruction and the flow of data addition, where

FIGS. 4A through 4D are drawings showing the structure of the printing instruction and the flow of data addition. As shown in FIG. 4A, the printing instruction is structured such that the basic structure thereof is the fields of "Printed Matter Specifications", "Plate Making Step", "Printing Step", "Folding Step", "Cutting Step", "Binding Step", and "Delivery Step". This printing instruction is described in a predetermined description format (e.g., JDF, or an XML description format in accordance with a description format other than JDF).

The "Printed Matter Specifications" are the respective items of the specifications of the printed matter which is the output result product of the printing processing system 1. Items defined in advance are used as the "Printed Matter Specifications", and are mainly inputted and set by a department such as business operations or the like which understands the needs of users such as the customers who request printed matter, and the like. For example, the structure, paper quality, size, number of copies, and the like correspond thereto. The "Plate Making Step" are items stipulating the process for making the plate for printing. The "Plate Making Step" is mainly inputted and set by a department such as step management or the like which manages the plate making step. For example, the machine which is used for plate making, the deadline by which the step must be completed, and the like correspond thereto. The "Printing Step" is items substantially stipulating the processing step of printing. The "Printing Step" is mainly inputted and set by a department such as step management or the like which manages the printing step. For example, the machine used for printing, the ink used for printing, and the like correspond thereto.

The "Folding Step" is items stipulating the processing step of folding the outputted matter after printing. The "Folding Step" is mainly inputted and set by a department such as step management or the like which manages the folding step. For example, the machine used for folding, the deadline by which the step must be completed, and the like correspond thereto. The "Cutting Step" is items stipulating the cutting processing step of cutting the outputted matter after printing or the outputted matter after completion of the folding processing. The "Cutting Step" is mainly inputted and set by a department such as step management or the like which manages the cutting step. For example, the machine used for cutting, the deadline by which the step must be completed, and the like correspond thereto. The "Binding Step" is items stipulating the processing step of binding the outputted matter after printing, or the outputted matter after completion of the folding processing, or the outputted matter after cutting. The "Binding Step" is mainly inputted and set by a department such as step management or the like which manages the binding step. For example, the machine used for binding, the deadline by which the step must be completed, and the like correspond thereto.

Figures 4B, 4C, 4D:
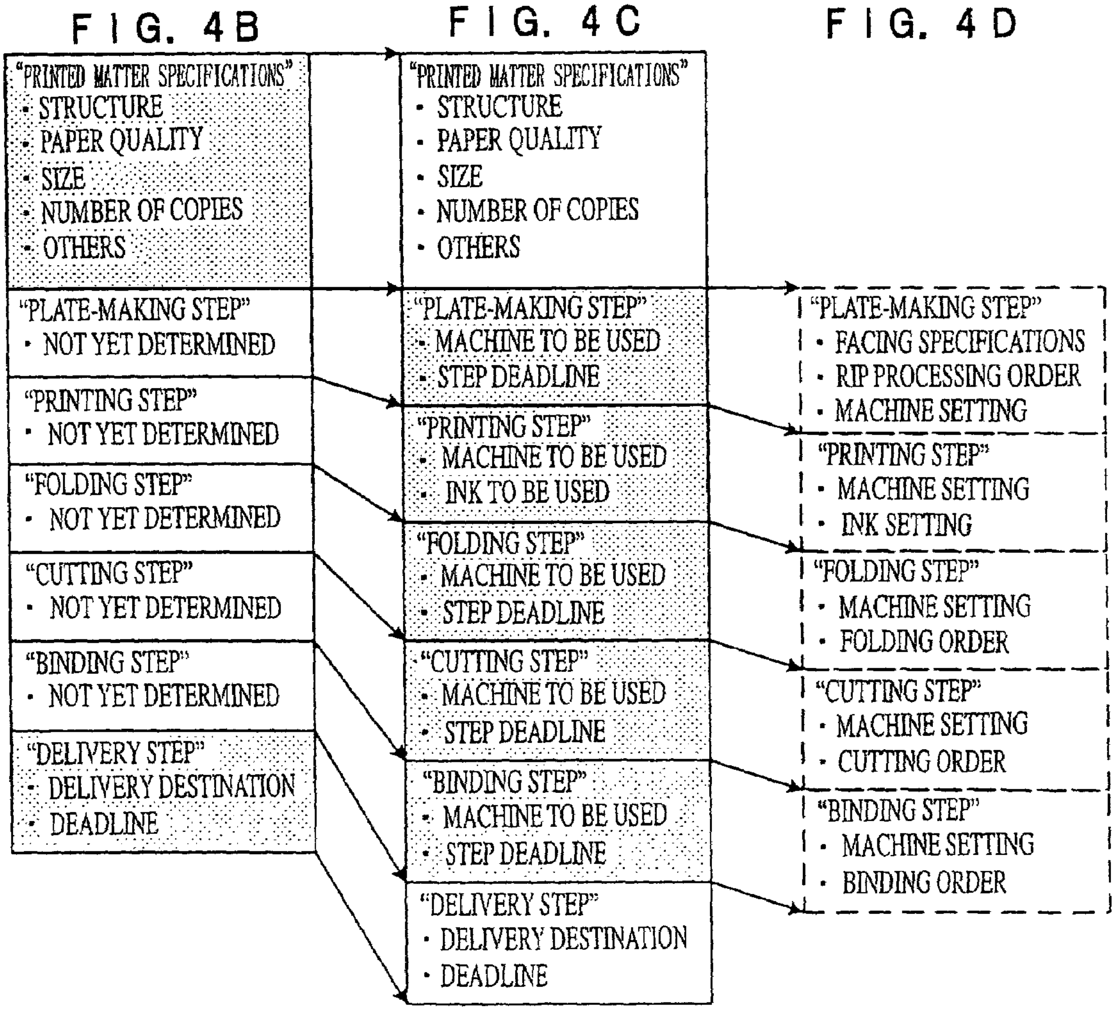

Due to a printing instruction 70, which is shown in FIG. 4A and in which the specific structure is not described, acquiring the wishes from the request for the printed matter, as shown in FIG. 4B, the "Printed Matter Specifications" and the "Delivery Step" are determined, and these determined items are described in the printing instruction 70. This processing is mainly implemented by input operation of the client terminal 10. Here, because specific items of the printing steps in accordance with the printing instruction 70 are not determined, the printing instruction 70 is distributed to the respective steps. As shown in FIG. 4C, data of the respective fields of "Plate Making Step", "Printing Step", "Folding Step", "Cutting Step" and "Binding Step" are determined, and these determined items are described in the printing instruction 70. These processings are carried out by the apparatuses of the respective steps, and are basically not affected by other apparatuses (steps). Namely, it suffices for the determined items of each step shown in FIG. 4C, which are determined at the respective steps, to correspond to the specification items which are processed at that step with respect to the steps other than that step, and detailed data within the step is not needed. However, when actually carrying out processing at each step, a determination of detailed specifications is needed. Therefore, as shown in FIG. 4D, at each step, detailed specification items for the time of carrying out processing in that step are determined and are implemented.

Printing Linked Processings

The user reads out the printing instruction, and implements the linked processings until the printed matter is obtained. Specifics are as follows.

Note that, in the present embodiment, the control apparatus which is in charge differs depending on the description format of the printing instruction. As an example, a case will be described in which the MIS apparatus 30 is in charge of printing instructions of a description format in accordance with JDF (hereinafter, "JDF format") as the first description format of printing instructions, and the linking server 40 is in charge of printing instructions of an XML description format in accordance with a description format other than JDF (hereinafter, "the other description format") as the second description format of printing instructions. However, the MIS apparatus 30 has the managing function of managing the entire printing processing system 1, and has the function of being able to prepare printing instructions described in description formats other than description formats such as JDF and the like (e.g., another format which is an XML description format in accordance with a description format other than JDF).

The client terminal 10 has a graphical user interface (GUI) function for carrying out predetermined operations such as instructing preparation of a printing instruction, and screen display for selecting the printing instruction to be started.

Figure 5:
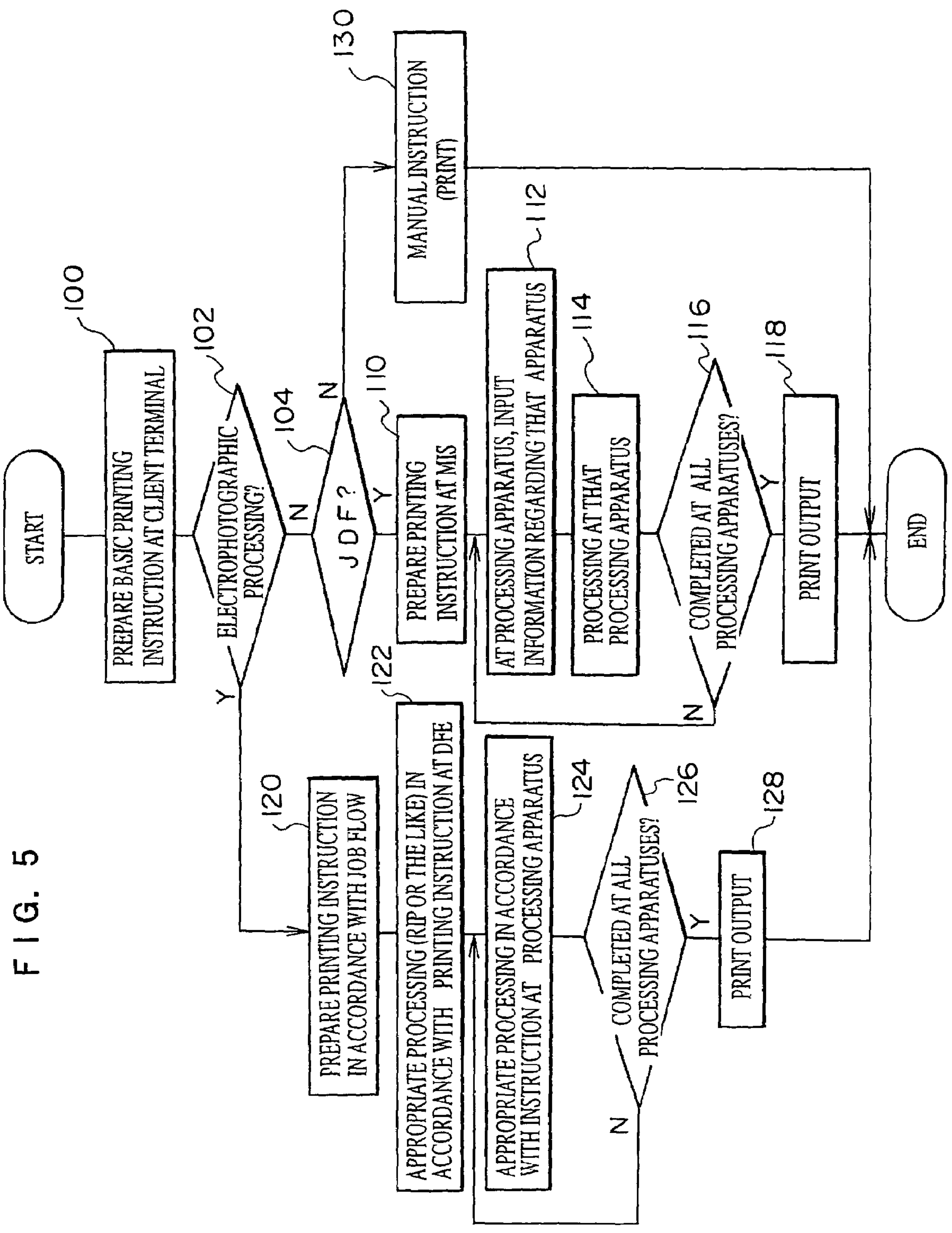
FIG. 5 is a process flowchart relating to linked processings from a request for a printed matter to obtaining of the printed matter.

A process flowchart relating to linked processings from the request for printed matter to the obtaining of the printed matter is shown in FIG. 5.

First, at the client terminal 10, a printing instruction (see FIG. 4A) formed from respective fields which have not yet been filled-in has been stored in advance, and this basic printing instruction which is stored is read out (step 100). At the client terminal 10, the read-out basic printing instruction 70 is displayed. Due to the user filling in the initially needed items in the basic printing instruction by an input operation, the basic printing instruction 70 which expresses the requirements of the printed matter is prepared, and is outputted to the exterior.

In this case, one of a printing instruction of the description format of the printing instruction 70 (i.e., the other description format), a printing instruction in JDF format, and a printing instruction for manual instruction, is selectively instructed. At this time, any of the aforementioned printing instructions may be set as initial values, in order to obviate selection of the printing instruction by the user who is operating the client terminal 10.

Note that the printing instruction is not limited to being stored in the client terminal 10. For example, the printing instruction may be stored in advance in the MIS apparatus 30, and may be read-out from the MIS apparatus 30. Further, an accumulating server which accumulates printing instructions may be connected to the network 2, and a printing instruction may be read-out from the accumulating server. Moreover, the function of an accumulating server may be provided at another apparatus connected to the network 2, and the printing instruction may be outputted in accordance with a request. Still further, a plurality of printing instructions may be dispersed and used in common at other apparatuses connected to the network 2, and the printing service relating to the printing which the user desires may be retrieved from among the plural apparatuses connected to the network 2.

Next, because one of a printing instruction in another description format, a printing instruction in JDF format, and a printing instruction for manual instruction is selected and instructed as the printing instruction 70, the processes up to the obtaining of the printed matter corresponding to the requirements of the printed matter are different. Namely, differentiation between the aforementioned three types of printing instructions is carried out (steps 102, 104). In the case of a printing instruction of another description format (an affirmative judgment in step 102), the printing instruction is prepared at the linking server 40 (step 120). In the case of a printing instruction in JDF format (a negative judgment in step 102 and an affirmative judgment in step 104), the printing instruction is prepared at the MIS apparatus 30 (step 110). In the case of a printing instruction for manual instruction (negative judgments in steps 102 and 104), the printing instruction is printed (step 130).

In the printing processing system 1 of the present embodiment, the processing apparatus which processes the printing service executes processes as follows, in accordance with the format of the printing instruction.

Printing Instruction in JDF Format

First, the processes corresponding to a printing instruction in JDF format will be described. When the basic printing instruction is a printing instruction in JDF format, the printing instruction is prepared at the MIS apparatus 30 (step 110).

Note that not all of the information relating to control of the linked processings of the services related to printing are described in the printing instruction in JDF format. In the printing instruction in JDF format, basic fields which are the steps relating to printing (hereinafter "printing related steps") are described, and the items in the fields are successively supplemented by the apparatuses which implement the respective services. In order to realize this linked processing, the MIS apparatus 30 can generate a basic printing instruction (see FIG. 4A) for linking (the services executed in) the printing related steps. Namely, the MIS apparatus 30 obtains and retrieves in advance location information expressing the positions (of the nodes) on the network 2 of the apparatuses which are in charge of or manage the printing related steps (services) in advance, and knows and manages the processing apparatuses which are dispersed on the network 2 and which process the printing related steps. Then, for the aforementioned basic printing instruction, the MIS apparatus 30 prepares an HTML file which becomes a GUI screen for reflecting the requests of the user, and in accordance with a request from the client terminal 10, transmits to the client terminal 10 the basic printing instruction as an HTML file which becomes a GUI screen.

The client terminal 10 transmits to the MIS apparatus 30 the HTML file which includes in-field items defined by operation of the user. The MIS apparatus 30 receives this HTML file, and prepares a printing instruction in which at least the requests of the user are reflected (FIG. 4B). The printing instruction is structured as a file in JDF format.

The MIS apparatus 30 can manage the interpretation and execution of the printing instruction, and the apparatuses relating thereto. The MIS apparatus 30 interprets the basic printing instruction received (from the client terminal 10), and in accordance with the printing related steps described in the printing instruction, outputs instructions to the respective processing apparatuses, and executes the printing linked processings. The MIS apparatus 30 stores information of the statuses of the linked processings which are currently being executed or information of the results of the linked processings which have been completed, and can give notice of the statuses or the results of the linked processings in accordance with a request from the exterior.

When the MIS apparatus 30 interprets the printing instruction and sends requests to the processing apparatuses in charge of the respective printing linked processes, there is no need to generate individual instruction information which have processing request contents, input parameters, information for specifying the document which is the object of processing, or the like, and these are processed within the printing related steps. Namely, the request of the MIS 30 to the processing apparatus is, provided that there is no particular instruction from the user, merely a notice that there is a request for the printing related step. Further, the processing apparatuses which are in charge of the respective printing related steps notify the MIS apparatus 30 of information relating to the specifications needed up to the time that the printed matter is obtained, such as the machines which can be used, the deadlines, and the like with respect to the request. On the basis thereof, the MIS apparatus 30 can supplement the fields of the printing instruction 70.

In the start-up processing, the processing apparatuses which are in charge of the printing related steps notify the MIS apparatus 30 of interface information including information expressing summaries of the respective printing related steps and the addresses. Further, the processing apparatuses in charge of the printing related steps set various types of specifications for managing the details of the respective printing related steps. The MIS apparatus 30 stores the interface information transmitted from the respective processing apparatuses in charge of the printing related steps.

In accordance with operation of the user and through an installed browser, the client terminal 10 accesses the URL (Uniform Resource Locator) of the HTML file or the like which has been prepared for a user interface screen, which URL the client terminal 10 itself internally provides or another service provides. In accordance with this browse request, the HTML file (basic printing instruction) of the user interface screen is sent to the client terminal 10 from the access destination, and is displayed on the screen at the client terminal 10. At this time, by using the user interface screen displayed on the client terminal 10, the user can define the specifications for obtaining the desired printed matter. Namely, the user inputs items such as the specifications and the like of the requested printed matter.

When the specifications of the printed matter have been defined via the user interface screen, the client terminal 10 transmits to the MIS apparatus 30 a printing instruction which includes the specifications of the printed matter defined by the user (an HTML file including in-field items defined by operation of the user).

On the basis of the printing instruction (the HTML file) which includes the specifications of the printed matter and is transmitted from the client terminal 10, and on the basis of the interface information acquired from the respective processing apparatuses, the MIS apparatus 30 prepares a printing instruction which defines information for specifying the respective printing related steps (step 110). In this way, the MIS apparatus 30 obtains a printing instruction in JDF format.

Next, the MIS apparatus 30 starts execution of the linked processings corresponding to the printing instruction in accordance with the instruction of the client terminal 10 (steps 112 through 118). First, the MIS apparatus 30 interprets the printing instruction from the client terminal 10, and for one printing related step described therein, informs the processing apparatus, which is in charge of that printing related step, that there has been a request instruction for the printing related step. The processing apparatus, which receives this and which is in charge of that printing related step, causes input of information relating to the specifications needed up to the time that the printed matter is obtained, such as the apparatus which can be used and the deadline and the like in its own step, and informs the MIS apparatus 30 of them (step 112). In addition thereto, the processing apparatus generates specific, individual instruction information having the processing request contents, input parameters, information for specifying the document which is the object of processing, and the like. Then, the processing apparatus implements the processing of the requested printing related step (step 114). The MIS apparatus 30 repeats the above-described processings until the instructions for all of the printing related steps described in the printing instruction have been completed (step 116). Processings of the DFE apparatus 20, the CTP apparatus 50, the printing press 52, the finisher apparatus 54, the delivery managing apparatus 56, the DDCP apparatus 58, and the like, correspond to the printing related steps here.

When all of the processings have been completed (an affirmative judgment in step 116), the processings in accordance with the printing instruction have been completed, and a corresponding post-processing is executed (step 118). Here, the printed matter prepared at the printing press 52 becomes a final printed matter at the finisher apparatus 54, and post-processing, such as managing the delivering at the delivery managing apparatus 56 or the like, is applicable.

Note that it is possible to carry out only the processings of inquiry and response relating to only the completion of the printing instruction (steps 112 through 116), and to carry out post-processing of the printed output (step 118) in accordance with a printing instruction prepared as a result thereof.

Figure 6:
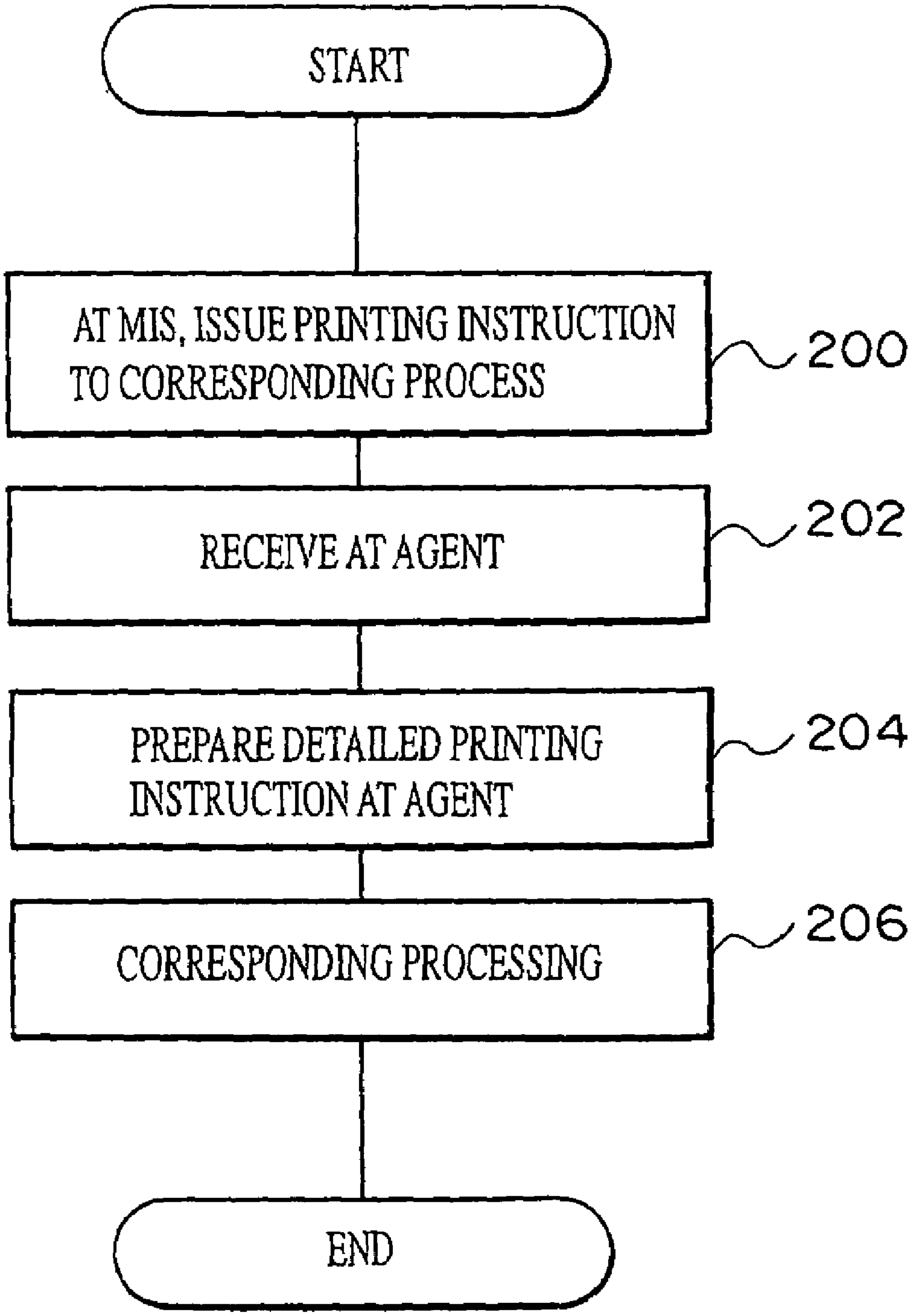
FIG. 6 is a process flowchart relating to a processing which is carried out at a processing apparatus which is in charge of one printing related step.
Figure 7:
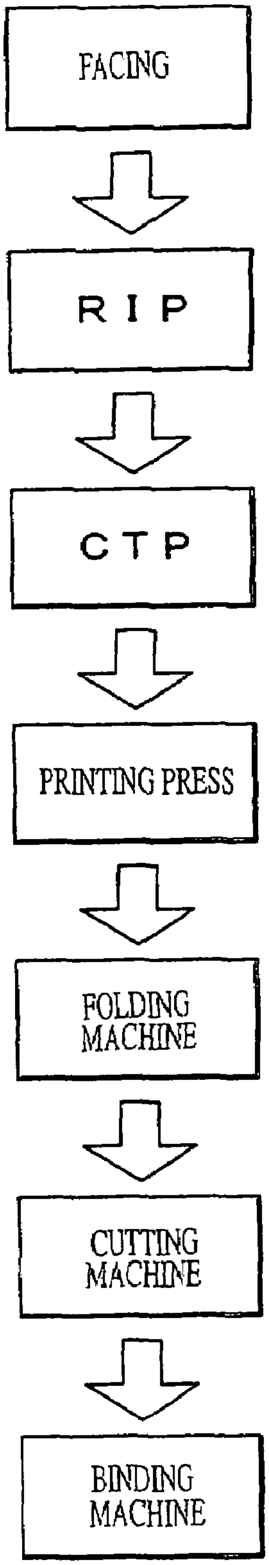
FIG. 7 is a diagram showing the flow of the printing steps.

Details of processings, which are carried out at the processing apparatus which is in charge of one printing related step described in the printing instruction from the client terminal 10 interpreted at the MIS apparatus 30, i.e., the processings carried out at the processing apparatus in steps 112 and 114, will be described. A process flowchart relating to the processings carried out at the processing apparatus which is in charge of the one printing related step is shown in FIG. 6. Note that, hereinafter, description will be given of a case in which the "Printing Step" is used as an example of the printing related step and the printing press 52 is used as an example of the processing apparatus which is in charge of the printing related step.

First, the MIS apparatus 30 interprets the printing instruction, and for the "Printing Step" described therein, requests implementation of the corresponding service (printing processing) (step 200). Here, a printing instruction in JDF format is issued to the printing press 52, and an agent 52X at the printing press 52 receives this printing instruction (step 202). The agent 52X interprets the received printing instruction which is in JDF format, and extracts the portion corresponding in its own process. The agent 52X displays, or the like, the instruction from the MIS apparatus 30, and displays a user interface screen in order to make the user who is managing the "Printing Step" input the information relating to the specifications needed up to the time that the printed matter is obtained, such as the apparatus which can be used and the deadline and the like in the "Printing Step". In this way, the user who is managing the "Printing Step" inputs the needed items such as the specifications and the like of the "Printing Step". The MIS apparatus 30 is informed of these inputted items. The state in which the items such as the specifications of the "Printing Step" and the like are inputted is shown in FIG. 4C.

Together therewith, the agent 52X generates specific, individual instruction information having the processing request contents, the input parameters, information for specifying the document which is the object of processing, and the like (step 204). In this way, the processings in the "Printing Step" can be executed. The individual printing instruction in which are inputted the items of the specific, individual instruction information in the "Printing Step" (the items of machine setting and ink setting in FIG. 4C), is shown in FIG. 4D. Then, as the corresponding processing in the "Printing Step", the printing press is operated and printing is carried out in accordance with the individual printing instruction shown in FIG. 4D (step 206).

Printing Instruction in Another Description Format

Next, the processes corresponding to a printing instruction in another description format will be described. Note that there are known techniques for linked processings in accordance with instructions (printing instructions) in other description formats. First, when the basic printing instruction is a printing instruction in another description format in XML, the printing instruction is prepared at the linking server 40 (step 120).

Note that all of the information relating to control of the linked processing of the services related to printing are described in the printing instruction in the other description format. In order to realize this linked processing, the linking server 40 retrieves services relating to the printing processing, and can generate a printing instruction for linking these services. Namely, the linking server 40 acquires in advance location information expressing the positions (of the nodes) on the network 2 which execute the services relating to the printing processing in advance. On the basis of this location information and from the processing apparatuses executing the services related to the printing processing which are dispersed on the network 2, the linking server 40 acquires and manages interface information expressing the input/output relationships of application programs and the respective processing apparatuses. On the basis of the acquired interface information, the linking server 40 prepares an HTML file which becomes a GUI screen for defining the job flow (the way of linking the services), and in accordance with a request from the client terminal 10, transmits to the client terminal 10 the HTML file which becomes the GUI screen.

The client terminal 10 transmits, to the linking server 40 and in accordance with CGI format, job flow information defined by operation of the user. On the basis of the job flow information relating to the service linkage instruction from the user and on the basis of the interface information of the respective services, the linking server 40 prepares a printing instruction which defines the contents of the processings requested to the respective services, input parameters, the way of linking the respective services (the job flow), and information for specifying the document which is the object of processing such as the document name, storage location information, or the like. The printing instruction is structured as a file in the other description format.

The linking server 40 can interpret and execute the printing instruction. The linking server 40 interprets the printing instruction received (from the client terminal 10), and, in accordance with the order and the method of use described in the printing instruction, calls-up in order the service processing apparatuses of the respective processing apparatuses (the image forming apparatus 62 and the like in the present embodiment), and executes the linked processings. Further, the linking server 40 stores information of the status of a linked processing which is being executed or the results of a linked processing which has been completed, and can give notice of the status or the results of the linked processing in accordance with a request from the exterior.

When the linking server 40 interprets the printing instruction and sends requests to the respective service processing apparatuses, the linking server 40 generates individual instruction information having the processing request contents, input parameters, information for specifying the document which is the object of processing, and the like. Note that the linking server 40 may describe, in the printing instruction, the relationships with the processings before and after the processings carried out at the respective service processing apparatuses, or may carry out the processing requests not in the format of the printing instruction, but rather in respective information exchange formats which are particular to the respective processing apparatuses and application programs executing the respective services.

The image forming apparatus 62, which is an example of the apparatus which implements the printing service, processes the document, i.e., carries out printing, on the basis of the service processing request contents, the input parameters, and the information regarding the document which is the object of processing, which are included in the processing request from the linking server 40. At the time of start-up, the image forming apparatus 62 informs the linking server 40 of its own interface information. This interface information is utilized at the time of preparing the printing instruction.

In the start-up processing, the service processing apparatuses, such as the image forming apparatus 62 or the like, notify the linking server 40 of their interface information including information expressing the respective service summaries and addresses. The linking server 40 stores the interface information transmitted from the respective service processing apparatuses such as the image forming apparatus 62 and the like.

First, in accordance with the operation of the user and through the installed browser, the client terminal 10 accesses the URL (Uniform Resource Locator) of the HTML file which has been prepared for the user interface screen, which URL the client terminal 10 itself internally provides or another server provides. In accordance with a browse request, the HTML file of the user interface screen is sent from the access destination to the client terminal 10, and is displayed on the screen at the client terminal 10. At this time, by using the user interface screen displayed on the client terminal 10, the user can define the desired flow of printing processing linkage (hereinafter called the "printing linking flow").

When the printing linking flow has been defined via the user interface screen, the client terminal 10 transmits, to the linking server 40, the printing linking flow information relating to the printing linking defined by the user.

On the basis of the information relating to the printing linking flow transmitted from the client terminal 10 and on the basis of the interface information obtained from the respective processing apparatuses, the linking server 40 prepares a printing instruction which defines the contents of the processings requested to the respective services, the input parameters, the way of linking the respective services, and information for specifying the document which is the object of processing such as the document name, storage location information, or the like (step 120). Then, the linking server 40 obtains a printing instruction in another description format.

Next, the linking server 40 starts execution of the linked processings corresponding to the printing instruction which is in accordance with the instruction of the client terminal 10 (steps 122 through 128).

The linking server 40 interprets the printing instruction, and, for the initial processing described therein, requests execution of the appropriate service processing (step 122). Here, RIP processing which generates an image for printing is appropriate. The linking server 40 prepares the individual instruction information for the DFE apparatus 20, and transmits it. At the DFE apparatus 20, the RIP processing generating the image is executed. When this processing is completed, the DFE apparatus 20 transmits, to the linking server 40, the results of processing such as processing status information (completed), output parameters, storage destination information of the document after processing (location information of the DFE apparatus 20 itself or of another apparatus), and the like.

Next, the linking server 40 interprets the printing instruction, and for the next processing described therein, requests execution of the appropriate service processing (step 124). Here, printing processing which prepares a print at the image forming apparatus 62 is appropriate. The linking server 40 prepares the individual instruction information for the image forming apparatus 62, and transmits it. At the image forming apparatus 62, printing processing is carried out. When this processing is completed, the image forming apparatus 62 transmits, to the linking server 40, the results of processing such as processing status information (completed), output parameters, storage destination information of the document after processing (location information of the image forming apparatus 62 itself or of another apparatus), and the like.

Next, the linking server 40 interprets the printing instruction, and judges whether or not there is another processing described therein. If there is a service which has not yet been processed (a negative judgment in step 126), the above-described processings are repeated. When all of the processings have been completed (an affirmative judgment in step 126), the processings in accordance with the printing instruction are completed, and the corresponding post-processing is carried out (step 128). Here, post-processings such as distributing the prints prepared at the image forming apparatus 62 or classifying the prints or the like, are appropriate.

Note that the linking server 40 can manage the processing results and the processing request results of the image forming apparatus 62 and the like as a log.

Printing Instruction in Manually Instructed Format

Next, the processes corresponding to a printing instruction in a manually instructed format will be described. Here, the printing instruction is a format which does not depend on the above-described formats, and there are cases in which the user executes the printing related processings by individual notification or notification in accordance with another communication form, or the like. Namely, the printing instruction in a manually instructed format is prepared at the client terminal 10 (step 130).

Note that all of the information relating to control of the linked processings of the services related to printing must be described in a printing instruction in a manually instructed format. In order to describe all of the information related to control of the linked processings of the services related to printing, the client terminal 10 has readied in advance a template into which all of the information can be filled-in. Due to the client terminal 10 filling-in (inputting information into) the template, the data of the printing instruction is prepared, and this is printed. By using the printed print, the user, by manual instruction, realizes the linked processings of the services related to printing by manual operation.

Fusion of Work Flows of Printing and Electrophotography

Description has been given above of a form in which printing processing is executed by using a conventional printing plate or the like or printing processing is executed by using an electrophotographic method, on the basis of the first printing instruction in JDF format or the second printing instruction in another description format, in accordance with the flowchart shown in FIG. 5.

Figure 8:
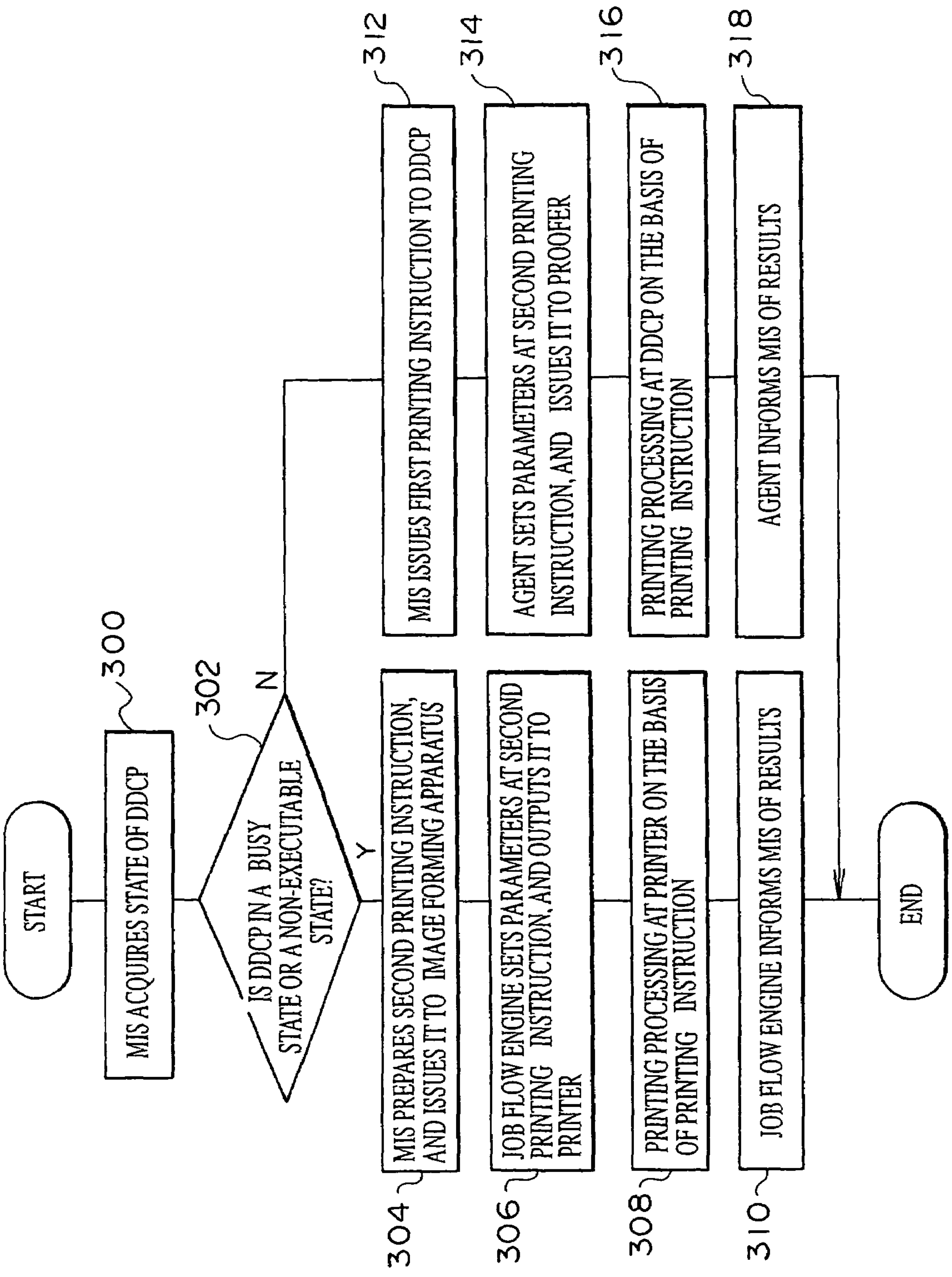
FIG. 8 is a flowchart showing the flow of processing which is an example of fusion of printing and electrophotographic work flows.

Here, explanation will be given of a case in which, when, among the processings included in the printing step instructed by the first printing instruction, there is a processing which cannot be executed, that processing is substituted by an apparatus which can execute substantially the same processing as that processing and at which processing based on the second printing instruction is possible. As an example, explanation will be given, with reference to the flowchart shown in FIG. 8, of a case in which, when printing for color proofing before printing is instructed by a first printing instruction, that processing is substituted by an apparatus at which processing based on a second printing instruction is possible. Note that the control shown in FIG. 8 is carried out in cases in which execution of color proofing is instructed in the printing related steps defined in the first printing instruction, and corresponds to the processings of steps 112 and 114 in FIG. 5.

Here, description will be given under the assumption that the MIS apparatus 30 (the detecting portion and the managing portion) has the function of generating not only first printing instructions but also second printing instructions, and the function of converting a first printing instruction into a second printing instruction.

First, the MIS apparatus 30 acquires the state of the DDCP 58 (step 300). Specifically, for example, the MIS apparatus 30 transmits to the DDCP 58 a command inquiring as to the state. Due to the MIS apparatus 30 receiving the reply from the DDCP 58, the MIS apparatus 30 can acquire the state of the DDCP 58. The state of the DDCP 58 may be an executable state which is a state in which no particular job is being executed, and processing in accordance with the instruction from the MIS apparatus 30 can be executed; a busy state which is a state in which a job from another apparatus is being executed, and the processing in accordance with the instruction from the MIS apparatus 30 cannot be executed; and a non-executable state which includes states in which processing cannot be carried out due to a malfunction or the power being off. Note that it is judged that there is a non-executable state in a case in which there is no reply even though a command inquiring as to the state is transmitted to the DDCP 58.

The MIS apparatus 30 judges whether or not the acquired state of the DDCP 58 is the busy state or the non-executable state (step 302). If the state of the DDCP 58 is the busy state or the non-executable state, the MIS apparatus 30 prepares a second printing instruction corresponding to the first printing instruction, i.e., a second printing instruction in which is described an instruction that printing processing for color proofing should be carried out, and outputs the second printing instruction to the image forming apparatus 62 (step 304).

The second printing instruction which has been issued from the MIS apparatus 30 is received at the job flow engine 62Z (second interpreting section) of the image forming apparatus 62. The job flow engine 62Z interprets the received second printing instruction, describes in the second printing instruction the parameters which should be set at the printer 62A at the time of the printing for color proofing, and outputs the second printing instruction to the printer 62A (the second executing section) (step 306). The parameters described in the second printing instruction include various types of printing conditions such as, for example, a page sequence specifying the order of the pages to be printed, the type and the size of the paper to be printed on, and the like. These parameters, for example, may be stored as predetermined parameters in an internal memory and read-out and used, or parameters set by operation of the user may be used.

When the printer 62A receives the second printing instruction from the job flow engine 62Z, the printer 62A carries out the printing processing for color proofing in accordance with the second printing instruction (step 308).

Then, the job flow engine 62Z monitors whether or not the printing processing by the printer 62A is completed. When the job flow engine 62Z senses that the printing processing by the printer 62A has been completed, the job flow engine 62Z informs the MIS apparatus 30 of this fact (step 310). The MIS apparatus 30 thereby recognizes that the printing for color proofing has been completed, and issues a second printing instruction to the apparatus which is to execute the next processing.

When the state of the DDCP 58 is the executable state, the MIS 30 outputs the first printing instruction to the DDCP 58 (step 312).

The first printing instruction issued from the MIS apparatus 30 is received at an agent 58X (first interpreting section) of the DDCP 58. The agent 58X interprets the received first printing instruction, describes in the first printing instruction the parameters which should be set at a proofer 58A (first executing section) at the time of the printing for color proofing, and outputs the first printing instruction to the proofer 58A (step 314). The parameters described in the first printing instruction include various types of printing conditions such as, for example, the angle, the type, the number of lines, and the profile of the screen, and the like. These parameters, for example, may be stored as predetermined parameters in an internal memory and read-out and used, or parameters set by operation of the user may be used.

When the proofer 58A receives the first printing instruction from the agent 58X, the proofer 58A carries out the printing processing for color proofing in accordance with the second printing instruction (step 316).

The agent 58X monitors whether or not the printing processing by the proofer 58A is completed. When the agent 58X senses that the printing processing by the proofer 58A has been completed, the agent 58X informs the MIS apparatus 30 of this fact (step 318). The MIS apparatus 30 thereby recognizes that the printing for color proofing has been completed, and issues a first printing instruction to the apparatus which is to execute the next processing.

In this way, in the present embodiment, when printing processing is to be executed in accordance with a first printing instruction in JDF, in a case in which printing for color proofing is instructed, if the DDCP 58 which can execute the processing based on the first printing instruction is in a non-executable state, a second printing instruction in accordance with another description format and corresponding to the first printing instruction is generated (converted), and by outputting the second printing instruction to the image forming apparatus 62 at which processings based on second printing instructions are possible, printing processing for color proofing is executed. Therefore, even if the DDCP 58 is in a non-operable state for a reason such as a malfunction or the like, it is possible to substitute printing processing for color proofing by the image forming apparatus 62 which is an electrophotographic-type printing apparatus, and printing processing can be carried out without missing the deadline.

In the present embodiment, description is given of a case in which, when printing for color proofing cannot be carried out at an apparatus at which processings based on first printing instructions are possible, a similar processing is carried out at an apparatus at which processings based on second printing instructions are possible. However, the present invention is not limited to printing for color proofing, and is applicable provided that the processing is a processing which is such that substantially the same processing can be carried out at an apparatus for first printing instructions and an apparatus for second printing instructions. For example, in a case in which a printed matter binding step is defined in the first printing instruction, if the finisher apparatus 54, which corresponds to JDF and which has the binding function, is in a non-operable state, a second printing instruction corresponding to the first printing instruction is prepared, and by outputting the second printing instruction to the image forming apparatus 62 which has the binding function, the binding function is substitutable.

Further, in the present embodiment, description is given of a case in which printing processing for color proofing is carried out by the DDCP 58 or the image forming apparatus 62 which are directly connected to the network 2. However, the present invention can be applied even in a case such as when color proofing processing is made to be carried out by the DDCP 64 or the image forming apparatus 68 which is connected subordinately to the BEP 60 (the image formation supporting apparatus). In this case, the acquisition of the state of the DDCP 64 and the issuing of the first printing instruction or the second printing instruction to the processing apparatus may be carried out via the agent 60X of the BEP 60. In this way, processing can be carried out in the same way as described above.

The present embodiment describes a case in which, when a processing cannot be carried out at an apparatus at which processings based on first printing instructions are possible, a similar processing is carried out at an apparatus at which processings based on second printing instructions are possible. However, the same holds for cases in which, when a processing cannot be carried out at an apparatus at which processings based on second printing instructions are possible, a similar processing is carried out at an apparatus at which processings based on first printing instructions are possible.

The present invention is not limited to preparation of or conversion to another printing instruction. Namely, for example, a processing apparatus, which can interpret first printing instructions and which can carry out the same processings as an apparatus for first printing instructions, can be used as the substitute processing apparatus.

When a substitute processing apparatus is set, there are cases in which the substitute processing apparatus is selected from among a plurality of exactly the same apparatuses, but there may be differences such as the apparatuses have the same function but are different models, or the manufacturers of the apparatuses are different, or there are differences in the description formats. In such cases, the differences which ultimately arise are in the processing time and the processing accuracy (the processing quality such as printing quality or the like). Therefore, setting of a substitute processing apparatus can be carried out actively. Namely, in the above description, the operating state is detected and when it is found to be an operable state, the processing apparatus is switched. However, a structure is possible in which the operating state is learned of, and, in a state in which the processing time and processing accuracy are set in advance or inputted, the processing apparatus is substituted by a processing apparatus which accords therewith. In this way, when a user requests extremely urgent printing, by accomplishing the printing processing by setting the fastest processing apparatuses within the printing processing system 1, printed matter can be provided in a state coinciding with the requests of the user.

The managing section may be structured so as to include a converting section converting the first printing instruction into the second printing instruction. Namely, the converting section prepares a second printing instruction which can execute substantially the same processing as the processing based on the first printing instruction.

Further, the first interpreting section and the second interpreting section may be structured so as to inform the managing section of the results of processing.

Moreover, the first processing apparatus may be structured from: a first interpreting section interpreting the first printing instruction, and classifying the request items included in the first printing instruction into processing steps determined in advance; and a first executing section executing a predetermined processing step among the classified processing steps; and the second processing apparatus may be structured from: a second interpreting section interpreting the second printing instruction, and classifying the request items included in the second printing instruction into processing steps determined in advance; and a second executing section executing a predetermined processing step among the classified processing steps.

The first interpreting section and the second interpreting section may be structured so as to be provided at an image formation supporting apparatus which is connected between, on the one hand, the managing section, and, on the other hand, the first processing apparatus and the second processing apparatus.

In this case, the first printing instruction or the second printing instruction is outputted to the first processing apparatus or the second processing apparatus via the first interpreting section or the second interpreting section included in the image formation supporting apparatus.

As described above, the present invention has the excellent effect of enabling fusion of a printing system, which carries out printing through a plurality of printing steps using a printing plate or the like, and an image forming system, which forms an image on a recording medium by an electrophotographic printer or the like.

What is claimed is:

1. A print managing system which processes a print job on the basis of a first printing instruction and a second printing instruction, the first and second printing instructions obtaining a printed matter, the first printing instruction containing a plurality of print steps for obtaining the printed matter, the print steps being described in a first description format, the second printing instruction containing a plurality of print steps for obtaining the printed matter, the print steps being described in a second description format which is different than the first description format, the print managing apparatus managing printing processing of the printed matter, and comprising:

a detecting section that detects whether or not a first processing apparatus, which executes a predetermined processing step among the print steps included in the first printing instruction, is in a state of being able to execute the predetermined processing step; and a managing section that outputs the first printing instruction to the first processing apparatus, when the first processing apparatus is in the state of being able to execute the predetermined processing step, outputs the second printing instruction to a second processing apparatus when the first processing apparatus is not in the state of being able to execute the predetermined processing step, wherein the second processing apparatus can be substituted for the first processing apparatus, and the second printing instruction corresponds to the second processing apparatus, the first and second processing apparatuses being able to request that a user input parameters necessary for printing processes in the at least one printing step, and the first and second processing apparatuses executing the printing processes, in at least one printing step, in accordance with the user inputted parameters, wherein the user inputted parameters include at least one of the following pieces of information: (1) the apparatus which can be used for completing the printing processes, and (2) the deadline for completing the printing processes, wherein the first processing apparatus has: a first interpreting section that interprets the first printing instruction, and classifies the print steps included in the first printing instruction into processing steps determined in advance; and a first executing section that executes a predetermined processing step among the classified processing steps: and the second processing apparatus has: a second interpreting section that interprets the second printing instruction, and classifies the print steps included in the second printing instruction into processing steps determined in advance; and a second executing section that executes a predetermined processing step among the classified processing steps.

2. The print managing system of claim 1, wherein the managing section includes a converting section converting the first printing instruction into the second printing instruction.

3. The print managing system of claim 1 wherein the first processing apparatus and the second processing apparatus are structured so as to notify the managing section of processing results at a time of executing a predetermined processing step.

4. The print managing System of claim 1, further comprising an image formation supporting apparatus connected between the managing section, and the first and second processing apparatuses, wherein the first interpreting section and the second interpreting section are provided at the image formation supporting apparatus.

5. A print managing method able to be executed in a printing system which processes a print job on the basis of a first printing instruction and a second printing instruction, the first and second printing instructions obtaining a printed matter, the first printing instruction containing a plurality of print steps for obtaining the printed matter, the print steps being described in a first description format, the second printing instruction containing a plurality of print steps for obtaining the printed matter, the print steps being described in a second description format which is different than the first description format, the print managing method managing printing processing of the printed matter, and comprising:

detecting whether or not a first processing apparatus, which executes a predetermined processing step among the print steps included in the first printing instruction, is in a state of being able to execute the predetermined processing step;

outputting the first printing instruction to the first processing apparatus when the first processing apparatus is in the state of being able to execute the predetermined processing step;

outputting the second printing instruction to a second processing apparatus when the first processing apparatus is not in the state of being able to execute the predetermined processing step, the second processing apparatus being able to substitute for the first processing apparatus and the second printing instruction corresponding to the second printing apparatus;

requesting input parameters from a user, the input parameters being necessary for the printing processes of the printing step; and executing the printing processes in the printing step in accordance with the user inputted parameters, wherein the user inputted parameters include at least one of the following pieces of information: (1) the apparatus which can be used for completing the printing processes, and (2) the deadline for completing the printing processes, wherein the first processing apparatus has: a first interpreting section that interprets the first printing instruction, and classifies the print steps included in the first printing instruction into processing steps determined in advance; and a first executing section that executes a predetermined processing step among the classified processing steps; and the second processing apparatus has: a second interpreting section that interprets the second printing instruction, and classifies the print steps included in the second printing instruction into processing steps determined in advance; and a second executing section that executes a predetermined processing step among the classified processing steps.

6. A printing system comprising:

a first processing apparatus:

a second processing apparatus and a computer readable storage medium having a computer executable program recorded thereon which processes a print job on the basis of a first printing instruction and a second printing instruction, the first and second printing instructions obtaining a printed matter, the first printing instruction containing a plurality of print steps for obtaining the printed matter, the print steps being described in a first description format, the second printing instruction containing a plurality of print steps for obtaining the printed matter, the print steps being described in a second description format which is different than the first description format, the program, when executed by the computer, enables the computer to perform a print managing method managing printing processing of the printed matter comprising:

executing managing processes of printing processing of the printed matter;

causing detection of whether or not a first processing apparatus, which executes a predetermined processing step among the print steps included in the first printing instruction, is in a state of being able to execute the predetermined processing step; and causing output of the first printing instruction to the first processing apparatus when the first processing apparatus is in the state of being able to execute the predetermined processing step;

causing output of the second printing instruction to a second processing apparatus when the first processing apparatus is not in the state of being able to execute the predetermined processing step, the second processing apparatus being able to substitute for the first processing apparatus, and the second printing instruction corresponding to the second processing apparatus;

requesting input parameters from a user, the input parameters being necessary for the printing processes of the printing step; and executing the printing processes in the printing step in accordance with the user inputted parameters, wherein:

the user inputted parameters include at least one of the following pieces of information: (1) the apparatus which can be used for completing the printing processes, and (2) the deadline for completing the printing processes:

the first processing apparatus to interprets the first printing instruction, and classifies the print steps included in the first printing instruction into processing steps determined in advance; and causing the executing section to executes a predetermined processing step among the classified processing steps;

and the second processing apparatus to interpret the second printing instruction, and classifies the print steps included in the second printing instruction into processing steps determined in advance; and a second executing section to executes a predetermined processing step among the classified processing steps.

7. A printing system which processes a print job on the basis of a first printing instruction and a second printing instruction, the first and second printing instructions obtaining a printed matter, the first printing instruction containing a plurality of print steps, the print steps being described in a first description format, the second printing instruction containing a plurality of print steps, the print steps being described in a second description format which is different than the first description format, the printing system comprising: a first processing apparatus that (1) interprets the first printing instruction, (2) requests that a user input parameters necessary for executing a predetermined processing step, and (3) executes the predetermined processing step among the print steps included in the first printing instruction in accordance with the user inputted parameters.

a second processing apparatus that (1) interprets the second printing instruction, (2) requests that the user input parameters necessary for executing a predetermined processing step, (3) classifies the print steps included in the second printing instruction into processing steps determined in advance, and (4) executes the predetermined processing step among the classified processing steps in accordance with the user inputted parameters, wherein the user inputted parameters include at least one of the following pieces of information: (1) the apparatus which can be used for completing the printing processes, and (2) the deadline for completing the printing processes;

a detecting section that detects whether or not the first processing apparatus is in a state of being able to execute the predetermined processing step; and a managing section that, when the first processing apparatus is in the state of being able to execute the predetermined processing step, outputs the first printing instruction to the first processing apparatus, and when the first processing apparatus is not in the state of being able to execute the predetermined processing step, outputs, to a second processing apparatus which can be substituted for the first processing apparatus, the second printing instruction which corresponds to the second processing apparatus, wherein the first processing apparatus has: a first interpreting section that interprets the first printing instruction, and classifies the print steps included in the first printing instruction into processing steps determined in advance; and a first executing section that executes a predetermined processing step among the classified processing steps; and the second processing apparatus has: a second interpreting section that interprets the second printing instruction, and classifies the print steps included in the second printing instruction into processing steps determined in advance: and a second executing section that executes a predetermined processing step among the classified processing steps.

8. The print managing system of claim 1, wherein a request of executing the printing process in at least one printing step is performed by sending a printing instruction to a processing apparatus and interpreting the printing instruction at the processing apparatus.

9. The print managing system of claim 1, wherein a process of, (1) requesting to execute each of the at least one printing steps and (2) requesting that the user input parameters, is repeated until the instructions for all of the at least one printing steps are completed.

10. The printing system of claim 8, wherein the printing system comprises a reception section that receives the printing instruction for setting the at least one printing step.

11. The print managing system of claim 1, wherein the managing section that outputs the second printing instruction to the second processing apparatus when the first processing apparatus is not in the state of being able to execute the predetermined processing step after converting the first printing instruction into the second printing instruction.

12. The print managing method of claim 6, wherein the outputting the second printing instruction to the second processing apparatus when the first processing apparatus is not in the state of being able to execute the predetermined processing step occurs after converting the first printing instruction into the second printing instruction.

13. The computer readable storage medium of claim 7, wherein the causing output of the second printing instruction to the second processing apparatus when the first processing apparatus is not in the state of being able to execute the predetermined processing step occurs after converting the first printing instruction into the second printing instruction.

14. The printing system of claim 8, wherein when the first processing apparatus is not in the state of being able to execute the predetermined processing step, the managing section converts the first printing instruction into the second printing instruction and outputs the second printing instruction to the second processing apparatus.

* * * * *